United States Patent [19]
Weir

[11] 4,018,428
[45] Apr. 19, 1977

[54] SHOCK ABSORBER
[75] Inventor: Thomas J. Weir, Jackson, Mich.
[73] Assignee: Hayes-Albion Corporation, Jackson, Mich.
[22] Filed: July 30, 1975
[21] Appl. No.: 600,415
[52] U.S. Cl. ............................ 267/65 R; 188/322; 267/34
[51] Int. Cl.² ...................................... F16F 5/00
[58] Field of Search ............ 267/22 R, 23, 34, 64 B, 267/62, 118, 121, 151, 64 R, 65 R; 188/281, 311, 322, 286, 287, 297, 313, 317

[56] References Cited
UNITED STATES PATENTS

| | | | |
|---|---|---|---|
| 45,329 | 12/1864 | Lindner | 267/22 |
| 1,143,070 | 6/1915 | Rock | 267/23 |
| 1,631,569 | 6/1927 | Aldrin | 267/34 X |
| 1,658,962 | 2/1928 | Aikens | 188/287 |
| 3,302,756 | 2/1967 | McIntyre | 188/322 X |
| 3,750,856 | 8/1973 | Kenworthy | 188/287 |

*Primary Examiner*—Johnny D. Cherry
*Attorney, Agent, or Firm*—John L. Cline

[57] ABSTRACT

An improved automotive shock absorber assembly comprises a housing containing a fluid, a shaft extending axially into the housing, a piston head connected to the shaft within the housing, a volute spring cooperating with the shaft and piston head and adapted to compress in the fluid when the shaft is subjected to axial loads, means for sealing the housing to prevent the leakage of liquid therefrom, and means for maintaining the shaft in axial alignment within the housing when the shaft is subjected to off-axis loads.

9 Claims, 1 Drawing Figure

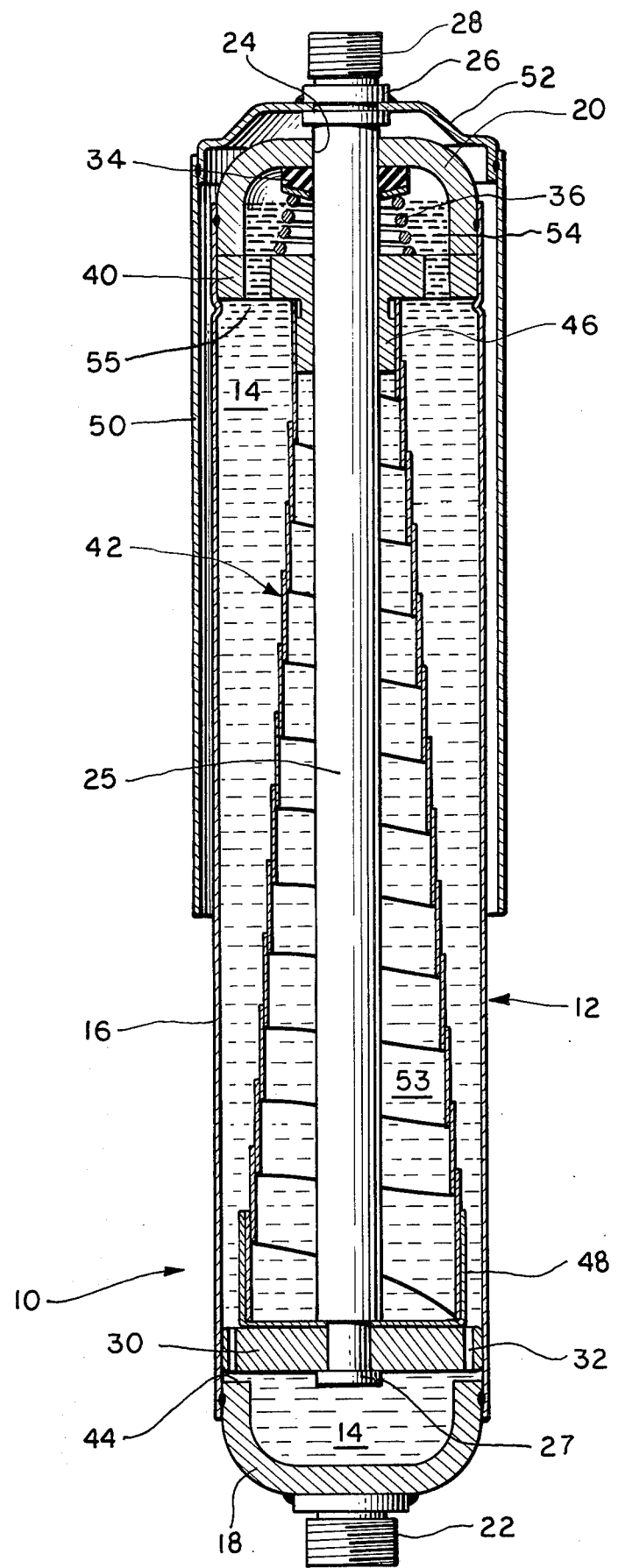

SHOCK ABSORBER

BACKGROUND OF THE INVENTION

The present invention relates generally to shock absorbing devices and, more specifically, to an improved automotive shock absorber assembly which utilizes a highly viscous liquid in conjunction with a volute spring and piston to achieve improved performance.

SUMMARY OF THE INVENTION

It is an object of the present invention to provide an improved shock absorber assembly.

It is another object of the invention to provide an automotive shock absorber with improved damping performance.

Still another object of the invention is to utilize a highly viscous liquid and a volute spring in an assembly which assures good shock absorbing characteristics and durability in use.

Accordingly, the present invention generally comprises an automotive shock absorber assembly including a housing which contains a fluid, a piston rod or shaft extending axially therein and a volute spring disposed therein and adapted to compress in the contained liquid upon axial displacement of the shaft. The assembly of the present invention further includes a piston head disposed within the housing and connected to the end of the shaft. The piston head maintains the shaft in substantially axial alignment within the housing. In order to obtain the high damping characteristics associated with the present invention, the volute spring has each of its ends fixedly secured in substantially sealed relationship thereby insuring that the fluid must flow between its closely spaced turns upon extension and compression thereof.

BRIEF DESCRIPTION OF THE DRAWING

The novel features which are believed to be characteristic of the present invention are set forth with particularity in the appended claims. The invention, however, together with its attendant advantages will be more readily understood and appreciated by reference to the description of the preferred embodiments presented hereinbelow taken in connection with the accompanying drawing which is an elevational view, in cross-section, showing one preferred embodiment of the present invention.

DETAILED DESCRIPTION OF THE INVENTION

Referring now to the drawing, the shock absorber assembly of the present invention, designated generally as 10, has a housing 12 which contains a liquid 14. The housing 12 incudes a lateral wall 16 and two end means, 18 and 20, each of which is joined to the lateral wall 16 in sealed relation. The end means 18 is joined, as by welding or other well known means, to a securement means such as the threaded stud 22. The end means 20 has an aperture 24 positioned centrally thereon.

The shaft 25 which extends into the housing 12 through the aperture 24 has a free end 26 joined to or made integral with a second securement means such as threaded stud 28. The other end 27 of the shaft 25 is disposed within the housing 12 and is connected to a piston head which serves as a means for maintaining the shaft 25 in axial alignment.

One preferred piston head and alignment maintaining means is illustrated in the drawing and comprises a plate 30 which slidably engages the inside surface of the lateral wall 16. The plate includes at least one orifice 32 which acts as a flow passageway for the liquid 14. Preferably, a plurality of orifices 32 are equally spaced circumferentially about the plate 30 in order to balance the forces acting on the plate 30 and the shaft 25 as they are axially displaced within the housing 12. Alternatively, the plate 30 may be in the form of a spider having radially extending arms which engage the lateral wall 16.

A sealing means is provided at the aperture 24 to prevent leakage of the liquid 14. A preferred sealing means, illustrated in the drawing, comprises an elastomeric ring 34 and a compression spring 36 both mounted over the shaft 25. The spring 36 rests on the annular bearing 40 and acts to bias the ring 34 against the end means 24.

As has been noted hereinabove, the present invention utilizes a volute spring 42 which is disposed in the housing 12 and adapted to compress in the contained liquid 14 when the shaft 25 is subject to an axial load. Thus, the shearing action of the fluid being squeezed through the clearance spaces between the turns on the volute spring provides the predominant damping action. The volute spring 42 is mounted to compress between the alignment maintaining means and one end means of the housing 12. For a shock absorber assembly, as illustrated in the drawings, the volute spring 42 is shortened and lengthened as the shaft 25 and plate 30 move axially within the housing 12. The volume of fluid 53 inside of the volute spring increases and decreases, as the shaft and plate assembly move up and down in the housing 12. As the volume decreases, fluid is forced to escape through the clearance spaces between the turns of the volute spring. Conversely as the shaft and plate assembly move downward in the housing 12, fluid is drawn into the space 53 through the clearance between the volute spring turns. This shearing action on the fluid dampens the oscillations of the shaft and plate assembly 25 and 30. In order to assure that substantially all fluid in space 53 passes between the volute spring turns, the ends of the volute spring 42 are attached to the extension 46 of annular bearing 40 and cup 48 in a substantially sealing relationship. Cup 48 and extension 46 also act as guides to position the volute spring concentrically with shaft 25.

The damping action obtained by the shearing action on the fluid is proportional to the area of the fluid in shear, the thickness of the fluid film between the spring coils, the viscosity of the fluid and the rate at which the fluid is sheared. High frequency oscillation will, therefore, produce high damping.

A preferred fluid for such application will have high viscosity and be stable over a wide temperature range. Many synthetic oils are available meeting these requirements. Silicone fluids exhibit the best characteristics. Chamber 54 is provided to receive fluid displaced from chamber 14 as the shaft 25 extends into the shock absorber. Fluid passages 55 in part 40 are provided for fluid flow between the two chambers.

In accordance with a preferred feature of the present invention, a shoulder 44 is affixed to the lateral wall 16 in order to limit the maximum expansion of the volute spring 42. As is illustrated in the drawing, the shoulder 44 may be an integral part of the end means 18 and is positioned to maintain the volute spring in a slightly compressed state for all positions of the shaft 25 and plate 30 in housing 12.

It is also contemplated, in accordance with another preferred feature of the invention, to utilize a covering sleeve 50 to protect shaft 25 when it is extended from the housing 12. As is illustrated in the drawing, the sleeve 50, has a generally cylindrical configuration with its closed end 52 secured to the shaft 25 adjacent the free end 26 thereof. The sleeve 50 telescopes over the housing 12 when the shaft 25 is fully inserted therein.

In addition, the shock absorber assembly disclosed hereinabove helps to eliminate potential sealing problems and damage at the point at which the shaft 25 enters the housing 12, by maintaining the shaft 25 in its proper axial alignment even when subjected to off-axis loads.

Of course, modifications, and changes to the invention will be readily apparent to those skilled in the art in view of the description of the preferred embodiment discussed hereinabove. These modifications and changes may be made without departing from the spirit of the present invention and without lessening its attendant advantages. Accordingly, all such modifications and changes are intended to fall within the scope of the following claims.

I claim:

1. An automotive shock absorber assembly comprising an elongated housing containing a viscous liquid, a shaft extending axially into said housing, alignment means disposed within said housing and connected to one end of said shaft, and a volute spring forming a chamber within said liquid, said spring cooperating with said alignment means and adapted to compress or extend in the contained liquid when said shaft is subjected to an axial load, said volute spring also having its ends secured within said housing in substantially sealed relation to necessitate liquid flow through adjacent turns of said spring upon compression or extension thereof, thereby producing viscous shear as the predominant energy absorption means of the assembly.

2. The shock absorber assembly of claim 1 further including means for sealing said housing to prevent leakage of the liquid therefrom at the entry point of said shaft.

3. An automotive shock absorber assembly comprising an elongated housing containing a liquid, said housing including a lateral wall and two sealed end means, one of said end means integrally joined to a first securement means and the other of said end means having a centrally positioned aperture; an axially extending shaft disposed in slidably relation through said aperture, said shaft having a free end joined with a second securement means and another end maintained within said housing; means connected to the other end of said shaft and slidably engaging the lateral wall of said housing for maintaining said shaft in axial alignment within said housing; means for sealing the apertured end means of said housing to prevent the leakage of said liquid therethrough; and a volute spring disposed within said housing and adapted to compress or extend between said alignment maintaining means and one of said end means when said shaft is subjected to axial loads, said volute spring having its ends secured within said housing in substantially sealed relation to necessitate liquid flow through adjacent turns of said spring upon compression or extension thereof, thereby producing viscous shear as the predominant energy absorption means of the assembly.

4. The shock absorber assembly of claim 3 further including an elongated sleeve covering a portion of said housing and secured to said shaft adjacent the free end thereof.

5. The shock absorber assembly of claim 3 further including shoulder means secured to the lateral wall of said housing, the volute spring adapted to bias said alignment maintaining means toward said shoulder.

6. The shock absorber assembly of claim 3 further including an annular bearing fixedly mounted within said housing adjacent said apertured end means, and said sealing means comprising an elastomeric ring and spring means mounted on said shaft between the fixed annular bearing and said apertured end means, said spring means adapted to bias the ring against the apertured end means.

7. The shock absorber assembly of claim 3 further including means to secure said volute spring in fixed axial alignment within said housing.

8. An automotive shock absorber assembly comprising a housing containing a viscous liquid and means forming a chamber within said liquid including a plurality of radially spaced wall portions defining spaces between adjacent wall portions, the volume of said chamber being adapted to change when said assembly is subjected to an axial load; said chamber being disposed such that an increase or decrease in the volume of said chamber will result in shearing of said liquid as it passes through said spaces between said wall portions thereby providing the predominant damping action for said assembly.

9. An automotive shock absorber assembly comprising an elongated housing containing a viscous liquid and a variable volume chamber disposed within said liquid; said variable volume chamber being defined by a volute spring means having sealed ends said volute spring means having radially spaced wall portions defining spaces between adjacent wall portions to provided shear producing passageways throughout substantially the entire length of said spring means; and said variable volume chambers being adapted to increase or decrease in volume when said assembly is subjected to an axial load, whereby upon the application of said load said liquid is sheared as it passes through said passageways to provide the predominant energy absorption function of the assembly.

* * * * *

UNITED STATES PATENT AND TRADEMARK OFFICE
CERTIFICATE OF CORRECTION

PATENT NO. : 4,018,428
DATED : April 19, 1977
INVENTOR(S) : Thomas J. Weir

It is certified that error appears in the above-identified patent and that said Letters Patent are hereby corrected as shown below:

Column 1, line 9, after "improved" insert damping.

Column 2, line 25, "on" should read --of--.

Column 3, line 52, "slidably" should read --slidable--.

Column 4, line 39, after "in" insert a.

Column 4, line 50, "vided" should read --vide--.

Column 4, line 52, "chambers" should read --chamber--.

Signed and Sealed this fifth Day of July 1977

[SEAL]

Attest:

RUTH C. MASON
Attesting Officer

C. MARSHALL DANN
Commissioner of Patents and Trademarks